Patented Sept. 7, 1943

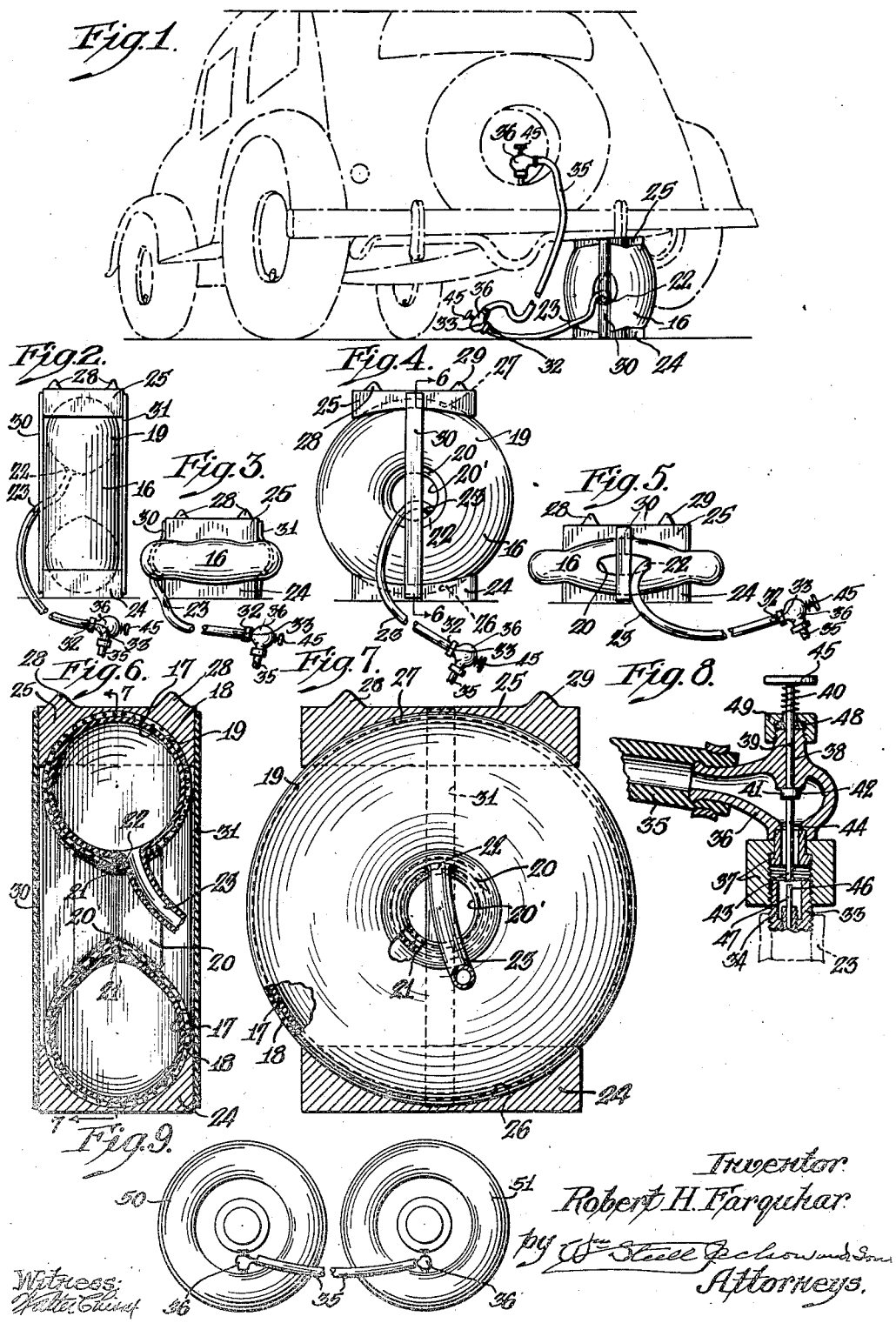

2,328,970

UNITED STATES PATENT OFFICE 2,328,970

PNEUMATIC JACK

Robert H. Farquhar, Lansdowne, Pa.

Application January 24, 1941, Serial No. 375,712

4 Claims. (Cl. 121—46)

My invention relates to pneumatic jacks and connections by which the jacks are supplied with air under pressure.

A purpose of my invention is to provide a jack in the form of a tire of large "tire" cross-section and of small interior "wheel" diameter.

A further purpose is to provide a jack in the form of a circular tire having base and cap and supplied with air under pressure to expand the tire to its full cross-section so as to apply the lifting force of the tire expansion upon a car.

A further purpose is to provide a pneumatic lifting jack and to fill it by air from a tire or tires, the air volume of the lifting jack when filled being small enough so that the jack may be distended effectively for lifting purposes without prohibitively reducing the pressure of the tire or tires.

A further purpose is to so relate the cross-section of a pneumatic car-lifting jack and a tire for the same car that the air within the tire may be distributed between the tire and jack while leaving enough pressure in the tire to make it possible to drive the car to a point of repair of or tire inflation.

A further purpose is to construct a car jack in the form of a special tire having tire cross-section comparable to that of the tires of the car lifted and a small average "tire" circumference, the whole capable of collapse into jack height.

A further purpose is to form a tire for jack purposes in the shape of an abnormal tire having large cross-section with respect to the diameter at the hub portion of the tire and to vulcanize the tire in collapsed position whereby with deflation the "tire" jack will collapse automatically, improving the facility of storage.

A further purpose is to provide a pneumatic jack having a valve outlet preferably at a distance from the jack with a valve and stem terminal comparable in character with the valve and stem in a tire, to connect the valve terminal of the pneumatic jack and the valve of an inflated tire for a car, by a flexible hose having fittings for engagement with the two valves and means for opening the valves mechanically while the connection is in place, whereby the air in the tire may be divided between the tire and the jack usually at equal pressure and whereby after the jack has performed its function the jack valve may be opened by mechanical pressure upon the valve stem to deflate the jack.

A further purpose is to use the air under pressure within an existing working tire or spare as a supply of air under pressure with which to inflate wholly or partially another tire or pneumatic jack.

My invention relates to the methods or processes involved and to mechanism whereby the methods or processes may be practiced.

I have preferred to illustrate my invention by one main form only, selecting a form which is practical, effective, reliable and inexpensive and which at the same time well illustrates the principles involved.

Figure 1 is a dot-and-dash view of an automobile and spare tire with a full line illustration of a pneumatic jack and hose connection between the valve of the tire and the pneumatic jack, the jack having an included tire rim.

Figure 2 is a side elevation of a jack in the form of a special pneumatic tire along with fragmentary illustration of a hose connection by which the jack may be filled from a spare or working tire.

Figure 3 is a side elevation of the tire jack of Figure 2 in collapsed position, the jack in this case not including any metal rim.

Figure 4 is an end elevation of a pneumatic jack of tire form with a fragmentary showing of a hose connection as used with the jack. The jack here carries an included tire rim.

Figure 5 is an end elevation similar to Figure 3 of the jack in tire form shown in collapsed position, and not including a rim.

Figure 6 is a section of a tire such as that seen in Figure 4, taken upon line 6—6 in Figure 4.

Figure 7 is a section of the structure seen in Figure 6 taken upon line 7—7.

Figure 8 is a fragmentary longitudinal section through a connecting hose and valve-opening terminal such as is suitable for connection with the valve of an existing tire or with a pneumatic jack having a pressure-valved terminal.

Figure 9 is a side elevation of two tires with a hose connection between them, showing means by which the air in the two tires is divided and distributed between the two.

In the drawing similar numerals indicate like parts.

The automobile shown in dot-and-dash is intended to be a normal automobile of any standard type. There need be nothing unusual or different in this car to suit my invention or to distinguish this car from other cars which are on the market today.

The automobile is shown in position with the rear right side of the car lifted slightly to provide for removal or replacement of the rear right tire or wheel. The pneumatic jack 16 lifts and supports the car, pressing against any suitable part of the car body or associated mechanism, such as any part of the body of the car, the axle or the bumper.

In Figures 1, 2, 4, 6 and 7 the pneumatic jack is shown in fully extended position to exert its maximum range of car lifting effort.

Figures 6, 7 and 8 are drawn to enlarged scale and Figure 9 is reduced in scale.

The jack itself is in the form of a tire. In order to reduce bulk, weight and expense it is preferably of single tube type, comprising a layer or layers 17 of air-confining preferably rubber tube interspersed with or surrounded by a layer or layers 18 of fabric or cord whose purpose is to restrain the extension of the tube and to limit the tube in its distended form to general tire shape at 19, though of a special type of tire in a number of particulars. A tire rim 20 is shown in most of the figures and is highly desirable since it supports the tire in reaching full symmetrical ultimate extension. Without the rim the space within the tire will not be maintained. The tire will flatten more than when the rim is present but on the other hand the jack will be collapsed about the central opening 20' even when the jack is deflated and will collapse to an oval even when the tubular member of the jack is fully expanded. The cross-section of the tube of the tire type jack is of excessive diameter, as compared with the rim or rim space diameter.

Because the tire-type jack is not intended for road travel nor for any other use which subjects it to wear or shock, the tire can be almost wholly devoid of the normal wear receiving tread or other special surface. The illustrations are intended to show the tire-type jack in a very simple form, largely diagrammatic and without attempt accurately to show the detail of the building up of the tire, for example, whereby the air is retained and the ultimate tire distension is controlled. In manufacture whatever number of layers there may be will not be so sharply distinct and separate as is the illustration and a band rod or ring 21 of one or more turns, including permissibly wire or cord may be used to limit the extension of the inner diameter of the doughnut-like tube comprising the effective jack.

Diagrammatically also, the connection for inflation of the tire-type jack is shown by connection 22 of a hose 23 with the interior rubber tube so as to permit inflation through this hose 23.

Applicant prefers to vulcanize the tire-type jack with a little air in it and in collapsed condition such as is roughly indicated for the rimless form in Figures 3 and 5, in order that there may be a tendency of the tire to collapse without necessity for forcing the air out wholly by weight or by separate pressure when the tire-type jack has been removed after partial deflation.

The construction in Figures 3 and 5 would look nearly the same even if rims were included as the "tires" would collapse about the ends of the rims.

In order that the pressure against the ground as a resting place and against the car may be distributed over a considerable area of the tire-type jack, a base 24 and a cap 25 are shown, concave at 26 and 27 to fit the contours of the inflatable "tire" of the jack. They may be secured to the jack permanently as by cement. To prevent lateral sliding movement of the cap, retaining projections 28 and 29 are used.

However, as alternative to this, or as additional to this, elastic straps 30 and 31 are shown which are attached in any suitable manner to the cap and base and normally hold the cap and base close enough together for deflation to be assisted by the pull of the straps tending to force the cap and base together, to the position of the parts seen in Figures 3 and 5.

The hose 23 terminates at 32 in a valved fitting 33 far enough distant from the jack to permit easy access to it when the jack is used in normal position beneath the car. The valved fitting of the hose presents the same character of threaded inlet (or outlet) nipple for connection that is used in a tire, so that the end of hose 23 and a regular tire valve may be treated alike in the way in which connections are made to the nipple 34 of either.

The rim space or "tire" space 20 within the jack can be very small—two or three inches, for example—even when the cross-section of the tire-like jack (the air space) when inflated is 6 or 7 inches.

In Figure 8 the connecting hose 35 is shown conveying air from a spare or working tire to a jack. The hose connection shown may be that either to the valved terminal at the end of the hose 23 or the valve of a tire, the terminal of hose 23 and the nipple for connection to a tire being the same. The connecting hose carries two connecting fittings 36, one at each end, connected to the hose by a binding ring and having a coupling at 37 whose swivel nut fits upon the nipple 34 in either event.

The fitting 36 is bored at one side or end at 38 to receive a pin or plunger 39, spring-pressed at 40, to bring a limiting collar 41 against a face 42 of the fitting. The lower end 43 of the pin or plunger 44 may be pressed inwardly by hand operation of the head 45 and will then engage the upper end 46 of the valve stem 47. As a result either valve may be opened by pressure upon the plunger head of the corresponding fitting, either to bleed air from the tire and allow the air to pass into the jack, at one fitting, or to allow the jack to recede by operation of the other.

In Figure 9, the identical type of connecting hose with fittings, one at each end as in Figure 1 is used for improving the pressure within a tire which is low by dividing the air and pressure between another tire or tires and the tire having low pressure. Either tire 50 or 51 is assumed to be at full pressure or at any rate at a pressure high enough to be able to spare some of its air supply from tire 50 for a tire 51 which is at low pressure. The valves of the two tires are connected through the hose and a plunger at tire 50 is pressed to permit flow of air out of tire 50. Because the air is coming to tire 51 in this Figure 9 the valve of tire 51 permits filling of the tire in normal course as from a tire pump. The fitting at tire 51 is not used other than as a passageway for the air from the body of the connecting hose into tire 51, the tire which is to be filled. The fitting at tire 51 is well suited to such use, but for this use could be any kind of a hose terminal capable of being connected with the nipple of tire 51. In other words, in this case the plunger of the fitting at tire 51 need not be used but is not objectionable in its presence and makes it possible for either end of the hose to be connected with the tire from which air is being taken without trouble to make sure that the end having a plunger for valve opening is secured to tire 50.

It will be evident that the ring or rings to which I have referred as limiting the stretch of the parts of the doughnut away from each other need not be located at the center as any construction serving their purpose would be helpful, the question of proper placing of the limiting ring or rings being primarily one of tire design or construction after the use intended has been pointed out.

The cap and base afford firm engaging surfaces for the "tire" and have been illustrated as preferably concaved to fit the contour of the inflated jack. This is the better form but partial results would be attained even if this concaving were omitted.

When reference has been made to the outer layer shown in the cross-section of the tire-like jack member as fabric it will be understood of course that any material will serve this purpose which is sufficiently thin, flexible and resistant to tension to serve. There is no intention to confine the material to what may technically be known as "fabric."

In view of my invention and disclosure variations and modifications to meet individual whim or particular need will doubtless become evident to others skilled in the art, to obtain all or part of the benefits of my invention without copying the structure shown, and I, therefore, claim all such in so far as they fall within the reasonable spirit and scope of my claims.

Having thus described my invention what I claim as new and desire to secure by Letters Patent is:

1. A pneumatic jack of doughnut form having a tubular flexible tire-like construction, the jack in use having the axis of the tire horizontal and operating by reason of the expansion of the tire radially of the doughnut, exerting a vertical lifting pressure, the diameter of the tire-like tube being larger than the diameter of the space between opposite inside parts of the tube, a rim within the doughnut, and a valve inlet for the tube.

2. A pneumatic jack of general doughnut shape having a flexible tire-like annulus of tubular section, the jack in use having the axis of the tire horizontal and operating by reason of the expansion of the tire radially of the doughnut, exerting a vertical lifting pressure, the diameter of the cross section of the tire-like annulus being greater than the diameter of the space surrounded by the annulus.

3. A lifting jack of general doughnut shape, in use having the axis of the doughnut horizontal and being provided with tubular tire-like annular walls comprising a rubber air-retaining annulus surrounded by a fabric layer to restrain undue expansion of the jack and a ring between the layers limiting the expansion of the diameter of the jack.

4. A lifting jack of flexible tire-like form and having its axis horizontal in use, a valve therefor, a cap and base for the jack fitting the radially exterior contour of the jack and resilient straps connecting the cap with the base and pulling them toward one another to facilitate exhaust of air from the jack after it has served its purpose.

ROBERT H. FARQUHAR.